(12) United States Patent
Zhu

(10) Patent No.: US 10,803,000 B2
(45) Date of Patent: Oct. 13, 2020

(54) PHASE-AWARE CONTROL AND SCHEDULING

(71) Applicant: Synopsys, Inc., Mountain View, CA (US)

(72) Inventor: Jun Zhu, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 102 days.

(21) Appl. No.: 16/207,567

(22) Filed: Dec. 3, 2018

(65) Prior Publication Data

US 2019/0171598 A1    Jun. 6, 2019

Related U.S. Application Data

(60) Provisional application No. 62/594,276, filed on Dec. 4, 2017.

(51) Int. Cl.
```
G06F 13/00      (2006.01)
G06F 13/362     (2006.01)
G06F 1/08       (2006.01)
```

(52) U.S. Cl.
CPC .......... *G06F 13/3625* (2013.01); *G06F 1/08* (2013.01)

(58) Field of Classification Search
CPC ......... G06F 13/00; G06F 13/3625; G06F 1/08
USPC .......................... 710/107, 110; 713/400–600
See application file for complete search history.

(56) References Cited

U.S. PATENT DOCUMENTS

| | | | |
|---|---|---|---|
| 6,393,541 B1 * | 5/2002 | Fujii | G06F 13/4243 711/167 |
| 6,785,793 B2 | 8/2004 | Aboulenein et al. | |
| 7,925,824 B2 | 4/2011 | Brittain et al. | |
| 2008/0263228 A1 * | 10/2008 | Kawasaki | G06F 13/36 710/1 |
| 2013/0297961 A1 * | 11/2013 | Zhu | G06F 13/4243 713/401 |

OTHER PUBLICATIONS

"General DDR SDRAM Functionality," Micron Technology, Inc., Technical Note TN-46-05, 2001.
"DDR Interface Design Implementation," Lattice Semiconductor Corporation White Paper, Hillsboro, Oregon, Dec. 2004.
(Continued)

*Primary Examiner* — Tim T Vo
*Assistant Examiner* — Kim T Huynh
(74) *Attorney, Agent, or Firm* — Sterne, Kessler, Goldstein & Fox P.L.L.C.

(57) ABSTRACT

Disclosed herein are system and electronic structure embodiments for implementing phase-aware control and scheduling. An embodiment includes a system with a bus controller configured to be activated in response to a first command. The bus controller may have a first clock speed and may drive an interface having a second clock speed. The system may further configure the bus controller to wait for a first time period in response to being activated, and a first circuit element structured to detect a first phase value of a first signal. In some embodiments, the bus controller may process a second command following passage of the first time period, and wait for a second time period, based on the detected first phase value and a ratio of the first and second clock speeds.

20 Claims, 18 Drawing Sheets

(56) References Cited

OTHER PUBLICATIONS

CDCVF855 (Active) 2.5V Phase Lock Loop DDR Clock Driver, Texas Instruments Inc., Datasheet SCAS839A, Apr. 2007, revised May 2007.
Maung, M., "Creating HyperLynx DDRx Memory Controller Timing Model," AppNote 10706, Apr. 30, 2009.
Grannæs, M., "Reducing Memory Latency by Improving Resource Utilization," Norwegian University of Science and Technology, Faculty of Information Technology, Mathematics, and Electrical Engineering, Department of Computer and Information Science, Trondheim, Norway, Jun. 2010.
Son, Y.H. et al., "Reducing Memory Access Latency with Asymmetric DRAM Bank Organizations," Proceedings of the 40th Annual International Symposium on Computer Architecture, Tel-Aviv, Israel, Jun. 23-27, 2013; pp. 380-391.
Denali High-Speed DDR PHY IP, Cadence Design Systems, Inc. Design IP Brochure, 2016.

* cited by examiner

```
// phase-aware counter: AND counter start conditions
always @(posedge clk or negedge reset_n)
    if (~reset_n)
        cnt <= reset_val;
    else if (cnt_start_cond1 & cnt_start_cond2)
        cnt <= init_val - ph_num + max(cnt_start_cond1_ph, cnt_start_cond2_ph);
    else if (cnt >= ph_num)
        cnt <= cnt - ph_num;
    else
        cnt <= 0;
```

FIG. 4

```
// phase-aware counter: OR counter start conditions
always @(posedge clk or negedge reset_n)
    if (~reset_n)
        cnt <= reset_val;
    else if (cnt_start_cond1 | cnt_start_cond2)
        cnt <= init_val - ph_num + min(cnt_start_cond1_ph, cnt_start_cond2_ph);
    else if (cnt >= ph_num)
        cnt <= cnt - ph_num;
    else
        cnt <= 0;
```

FIG. 5

```
reg [5:0] t_rcd_cnt;

always @(posedge core_clk or negedge reset_n)
    if (~reset_n)
        t_rcd_cnt <= 6'h00;
    else if (act)
        t_rcd_cnt <= init_t_ccd_cnt - 1;
    else if (t_rcd_cnt > 0)
        t_rcd_cnt = t_rcd_cnt - 1;
```

FIG. 10

```
reg [5:0] t_rcd_cnt;

always @(posedge core_clk or negedge reset_n)
    if (~reset_n)
        t_rcd_cnt <= 6'h00;
    else if (act)
        t_rcd_cnt <= init_t_rcd_cnt - fr_mode + act_ph;
    else if (t_rcd_cnt >= fr_mode)
        t_rcd_cnt <= t_rcd_cnt - fr_mode;
    else
        t_rcd_cnt <= 6'h00;
```

FIG. 11

```
reg [5:0] t_ccd_cnt;

always @(posedge core_clk or negedge reset_n)
    if (~reset_n)
        t_ccd_cnt <= 6'h00;
    else if (rdwr)
        t_ccd_cnt <= init_t_ccd_cnt - fr_mode + rdwr_ph;
    else if (t_ccd_cnt >= fr_mode)
        t_ccd_cnt <= t_ccd_cnt - fr_mode;
    else
        t_ccd_cnt <= 6'h00;
```

FIG. 12

PHASE-AWARE CONTROL AND SCHEDULING

CROSS-REFERENCE TO RELATED APPLICATIONS

This application claims the benefit of U.S. provisional patent application 62/594,276, filed Dec. 4, 2017, the entirety of which is incorporated by reference herein.

BACKGROUND

Double data rate (DDR) bus technologies change rapidly to meet market and industry requirements. For example, DDR Type 5 (DDR5) and Low-Power DDR5 (LPDDR5 or Mobile DDR5), to name a few standards, officially support transfer rates of 6.4 GT/s at the DDR interface. Conventional DDR controllers have a synchronous digital design running with a DDR controller core clock. DDR controller clock cycles dictate granularity of control and computing.

For example, counters may count as fast as the controller clock speed, but generally not faster. In this context, high-frequency interface clocks often introduce new challenges to DDR controller design. Additionally, while DDR may be one common example, these constraints and challenges also present themselves with other data rates and bus types where there may be a disparity in clock speeds between a core clock and an interface clock. Such disparities may result from increasing internal complexity of controllers despite a need for faster operations at an interface level.

BRIEF DESCRIPTION OF THE DRAWINGS

FIG. 4 shows an example of a phase-aware counter, according to an embodiment.

FIG. 5 shows an example of a phase-aware counter, according to another embodiment.

FIG. 10 shows an example of a clock-cycle-based counter design, according to some embodiments.

FIG. 11 shows a Verilog-based example of a phase-aware counter, according to some embodiments.

FIG. 12 shows an example of a phase-aware counter design, according to some embodiments.

DETAILED DESCRIPTION

Definitions

In a bus controller with an interface, on a data bus that can handle input/output (I/O) events, a frequency ratio of a controller clock speed to an interface clock speed may be varied, e.g., from 1:1 to 1:2, and further to 1:4. For example, if a DDR interface clock (DDR_clk) has a clock speed of effectively 3.2 GHz, the DDR controller clock, or core clock (core_clk), would be 1.6 GHz in 1:2 mode, or 800 MHz 1:4 mode, respectively. DDR clock may be used to simulate a clock speed value for reference instead of an actual clock, in some embodiments. In this document, based on the core clock to DDR interface clock speed ratio, frequency modes (fr_mode) may be defined per the examples below:

1:1 mode: core clock and DDR interface clock run at the same frequency;

1:2 mode: core clock frequency is half of the DDR interface clock frequency; and 1:4 mode: core clock frequency is a quarter of DDR interface clock frequency.

For purposes of this disclosure, measuring relative clock times in terms of core clock cycles versus in terms of interface clock cycles, core clock times are represented with a lower-case 't' followed by the number of respective core clock cycles while interface clock cycles are represented with an upper-case 'T' followed by the number of respective interface clock cycles. For example, initial times may be both t0 and T0, but if the core clock runs at a different rate from the interface clock, as it would in 1:2 mode or 1:4 mode, then at a time t2, when two core clock cycles have elapsed, the interface clock time may be represented by T4 in 1:2 mode and T8 in 1:4 mode. Together, these clock time measurements may be represented as t2 (T4) and t2 (T8), respectively, for purposes of this disclosure. Any other suitable representations would not change the scope or spirit of this disclosure. Additional cycles of the interface clock may complete before the next complete cycle of the core clock. For example, it is also possible to have t2 (T9), t2 (T10), and t2 (T11) in 1:4 mode. Other than modes such as 1:2 or 1:4, as mentioned in the examples above, the interface clock speed may run at any integer multiple of the core clock speed, not only 2 or 4, in some embodiments.

To define phase of a clock cycle, for example, in 1:2 mode, there may be two phases in one core clock cycle, while there may be four phases in one clock cycles in 1:4 mode. Similarly, it is possible to define a phase for any arbitrary signal. Phase may be used with respect to any control signal, including state (transition). Phase of a signal may provide an indication (to downstream logic, for example) of when the signal is active or available, starting from a given value of the phase. Phase may be treated as a separate signal.

DESCRIPTION

The physical layer (PHY) of a DDR controller may implement a parallel-to-serial conversion. For example, FIG. 1 shows a relationship between bus commands, e.g., DDR interface commands, and controller commands, according to an embodiment.

Figure 1:
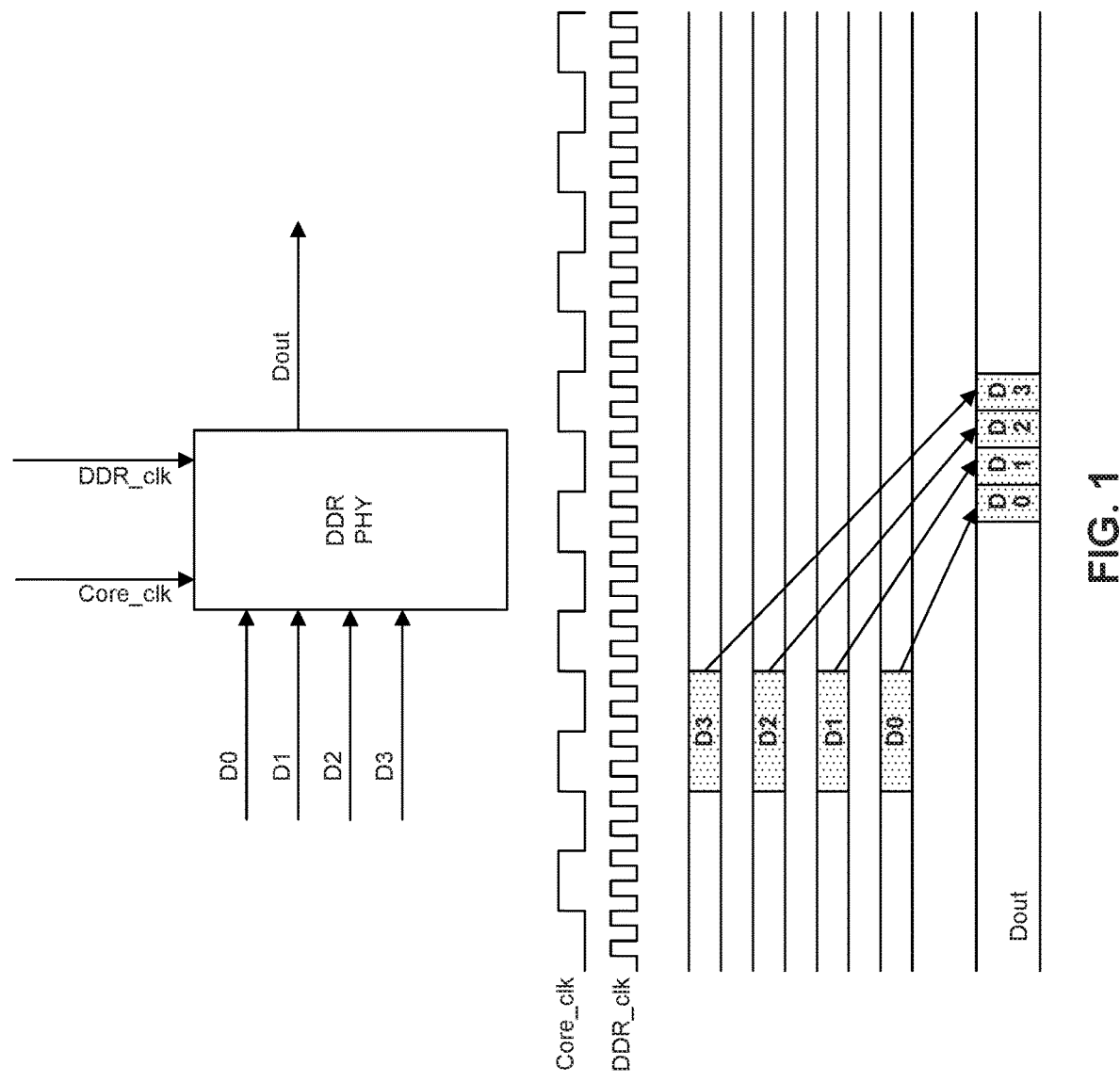
FIG. 1 shows a relationship between bus commands and controller commands, according to some embodiments.

FIG. 1 shows an example in 1:4 mode. In accordance with at least the definitions set forth above, the core clock may be one-fourth of the effective target frequency of DDR clock. For example, DDR controller may send four elements of data (or four commands) in one core clock cycle (D0, D1, D2 and D3), to the DDR PHY at core clock frequency.

The DDR PHY may serialize the four data elements or commands in a designated order and send to DDR, which may take four consecutive DDR clock cycles. In some embodiments, DDR clock may not be an actual physical clock generator on the PHY, but rather may only serve as a reference value to show a desired operating speed of a DDR interface, for example.

Figure 2:
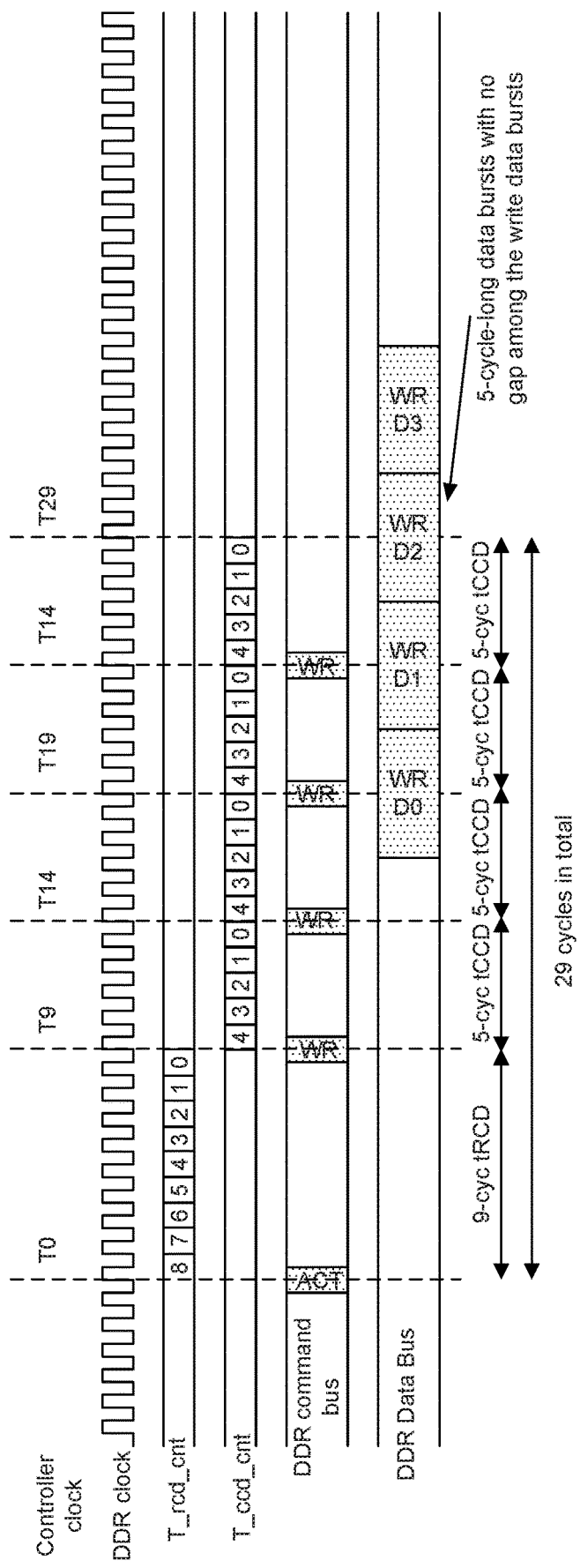
FIG. 2 shows a 1:1-mode example of a command sequence, according to some embodiments.

DDR controls may also be timing-based. FIG. 2 shows a 1:1-mode example of a command sequence for a DDR controller as follows:

201. Before accessing the DDR controller, one or more computer processors may provide an address to the DDR controller to access. In turn, the DDR controller may decode the address to determine a row of a DDR device (e.g., a memory or memory-mapped device for input/output) to be accessed. To open this row in DDR device, the DDR controller may send an Activate (ACT) command to the DDR device, for example, at time T0.

202. A minimum row-address-to-column-address delay (tRCD) may be needed as a wait time after the ACT command is sent before the DDR controller is ready for a read (RD command) or write (WR command). In an embodiment, tRCD may be nine DDR clock cycles. Thus, after waiting nine DDR clock cycles, a processor may send a first WR command to DDR, at T9. A counter may be designated, e.g., as t_rcd_cnt, to enforce the waiting period for tRCD. The t_rcd_cnt counter may start counting down at t0 (T0) from 8 to 0. When the t_rcd_cnt counter reaches 0 (wait time passed), the WR command may be sent.

203. One WR command may correspond to one DDR memory burst, which may be five clock cycles long in this case. Five clock cycles later, a second WR command may be sent to DDR, at t14 (T14). Thus, a minimum column-address-to-column-address delay (tCCD) between any two read/write operations may be needed before the next command is processed. Another counter may be designated, e.g., as t_ccd_cnt, to enforce this waiting period for tCCD. The t_ccd_cnt counter may be used for this timing control, which may count from 4 down to 0, signifying passage of the enforced wait time period. Every RD/WR command may re-load the t_ccd_cnt to its initial value, which may be 4, in this case, and trigger another round of counter counting from 4 down to 0.

204. Repeat the 203 until all four WR commands are sent.

205. The whole process of the 4-burst writes may take 29 clock cycles in total, without gaps among the data bursts.

206. In 1:1 mode, DDR controller may run at same clock speed, and may be able to count and send commands in the above sequence with same timing.

Figure 3A:
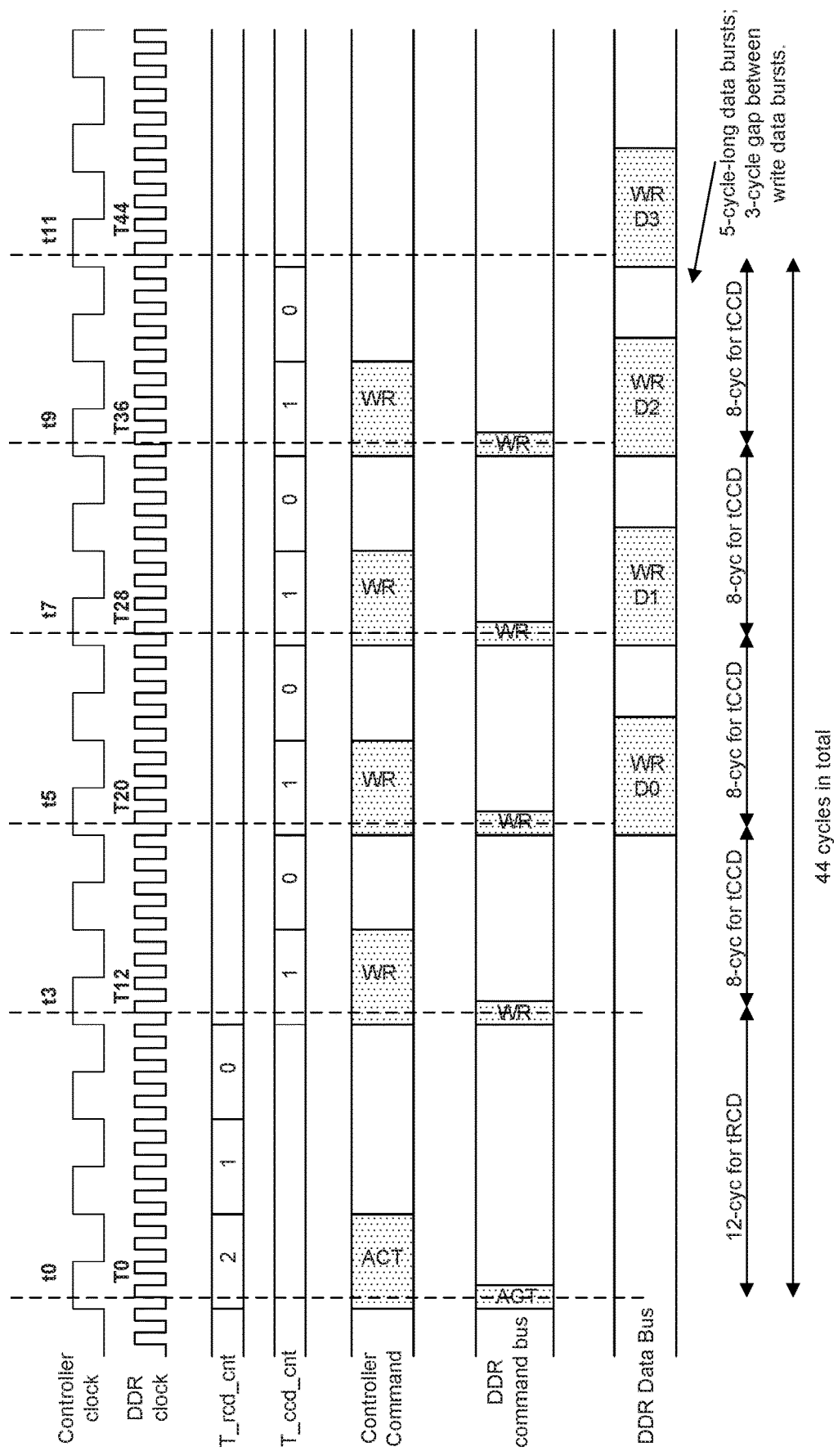
FIG. 3A shows a 1:4-mode example of a command sequence, according to some embodiments.

In contrast to 1:1 mode, either of 1:2 mode or 1:4 mode may reduce efficiency of the controller's operation. FIG. 3A shows an example in 1:4 mode. Performing substantially the same steps as with the 1:1-mode example from above, a row may be opened, and four burst-write commands may be sent to DDR, in an embodiment as follows:

301. Where a DDR controller may run at core clock speed, any timers or counters may also accordingly run at the core clock speed. In order to meet the same tRCD wait time, (described above) of nine DDR clock cycles after sending the ACT command, the DDR controller may then need to count three core clock cycles, equivalent to twelve DDR clock cycles in 1:4 mode. Thus, if the ACT command is sent out at time t0 (T0), the first WR command would be sent out at time t3 (T12). The t_rcd_cnt counter may count down from 2 to 0 before the same WR command is ready to be sent.

302. Because the DDR data burst is five cycles long, the controller may need to wait two clock cycles before sending the second WR commands. DDR controller sends out the second WR command at t5 (T20). The t_ccd_cnt counts from 1 to 0.

303. Repeat 302 until all four WR commands are sent out.

304. Two WR commands may require two core clock cycles, equivalent to eight DDR clock cycles in 1:4 mode. Because the WR data burst is only five cycles long, there is a gap of three DDR clock cycles between adjacent write data bursts.

305. The whole write process of four WRs takes eleven core clock cycles corresponding to 44 DDR clock cycles.

Comparing with above two cases, inefficiencies may be seen when using 1:4 mode or 1:2 mode, for example. The same operations that take 29 DDR clock cycles in 1:1 mode may take 44 DDR clock cycles in 1:4 mode, for example—to compare:

1. Three more DDR clock cycles may be required for tRCD—twelve cycles vs. nine cycles. Thus, the first data latency may last three cycles longer in this case.

2. Three more clock cycles may be required for each WR command, in some embodiments—eight cycles versus five cycles. Thus, bus utilization may drop from 100% to 62.5% (⅝) in this case.

Some causes of these inefficiencies may include the following:

1. Coarser granularity of timing control granularity may be a result of the core clock speed being slower than the reference interface clock speed.

2. The timing constraints such as tRCD, tCCD, etc., may bee based on the reference DDR interface clock, which may be faster than the core clock speed otherwise may allow. Such timing constraints are not necessarily a multiple, e.g., 2 or 4, of respective clock frequency ratios as in 1:2 or 1:4 modes.

Phase-Aware State Machines and Controls

To improve performance in use cases involving any inefficiencies such as the issues identified above, as may be present in DDR controllers, phase-aware control and scheduling may mitigate these inefficiencies and may also yield other advantages and benefits that would be readily appreciated by persons skilled in the relevant art. For example, phase-aware control may provide sub-clock-cycle control granularity even at relatively low clock speeds of the core clock of a controller. In an embodiment, a 500-MHz core clock with 2-bit phase signals may yield control granularity equivalent to using a 2-GHz core clock.

Phase

One or more separate signals corresponding to control signals may be designated as "phase signals" that may be alternated within the duration of a cycle of a core clock, thus partitioning a single core clock cycle into multiple sub-cycle phases. Thus, control granularity may be determined not only by clock edges, but also by separate signals in addition to or instead of clock signals alone. As clock speeds may ultimately run up against physical limitations for any single clock signal, use of multiple signals to define phases may transcend such speed limitations of individual clock signals, allowing for effectively more granular control and signal detection equivalent to running a discrete clock at higher speeds.

Figure 13:
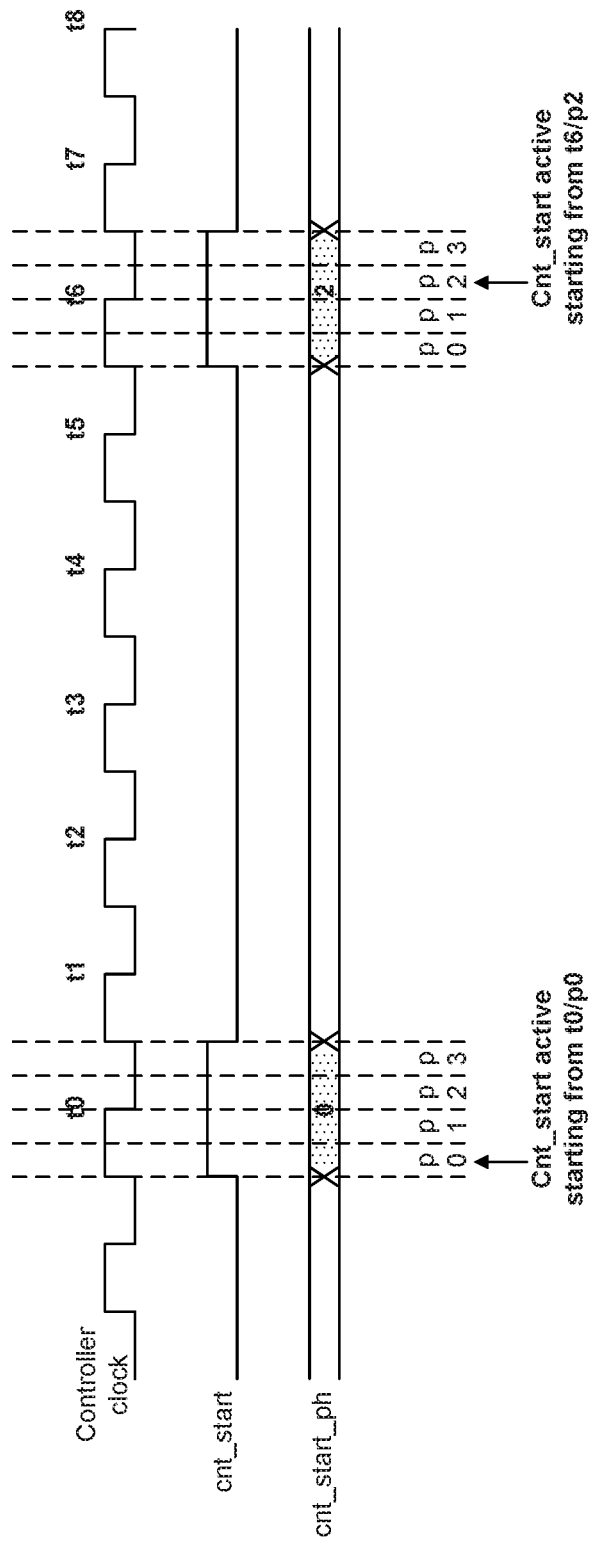
FIG. 13 shows an example of how a clock-cycle-based counter may operate, according to some embodiments.

FIG. 13 shows an example of a clock-cycle-based system with coarse granularity. To demonstrate, a given signal, e.g., called cnt_start, may have a high value in cycle t0 and in cycle t6 of a (core) controller clock, while having a low value in other cycles. However, if only looking at full cycles (e.g., defined by rising edges) of the controller clock, there may be no way to determine when (within the cycle of the controller clock) the cnt_start signal became active, switching from low to high, until the next rising edge of the controller clock. In actual operation, the case may be that cnt_start transitioned high near the beginning of cycle t0 in the first instance, but in later transitioned high near the middle of cycle t6 in the second instance, as shown in FIG. 13.

By alternating and detecting phase, a given system or electronic structure may be able to detect or control transitions of specific control signals, in finer granularity than otherwise possible using only a single clock at a given clock speed, for example. Thus, the system or electronic structure may perform at speeds and efficiencies approaching or equivalent to those previously attainable only by use of a faster core clock, for example.

Clock-Cycle-Based Counters and Phase-Aware Counters

Counters used in digital design may often be cycle-based, counting per clock cycle. By contrast, phase-aware counters may be independent of a given clock signal. Phase-aware control depends on use of at least one phase-aware counter as a component. Examples of each of a cycle-based counter and a phase-aware counter as described in a hardware description language (HDL) are shown side-by-side in Table 1 below.

TABLE 1

| // cycle-based counter | // phase-aware counter |
|---|---|
| always @(posedge clk or negedge reset_n) | always @(posedge clk or negedge reset_n) |
|   if (~reset_n) |   if (~reset_n) |
|     cnt <= reset_val; |     cnt <= reset_val; |
|   else if (cnt_start) |   else if (cnt_start) |
|     cnt <= init_val − 1; |     cnt <= init_val − ph_num + cnt_start_ph; |
|   else if (cnt > 0) |   else if (cnt >= ph_num) |
|     cnt <= cnt − 1; |     cnt <= cnt − ph_num; |
|   else |   else |
|     cnt <= 0; |     cnt <= 0; |

Some differences between the two counters are as follows:

1. When an activation signal, cnt_start, is high, cycle-based counter may load the (init_val−1), while phase-aware counter may load (init_val−ph_num+cnt_start_ph). In this case, ph_num may indicate how many phases there are in one clock cycle, e.g., in 1:4 mode, there are four phases in a clock cycle, and ph_num may be set to 4. The cnt_start_ph is the phase coming with cnt_start, meaning cnt_start is 1 in cnt_start_ph phase of this clock cycle. We call cnt_start_ph the phase offset of cnt_start. So, cnt_start_ph is carried over in counter's counting.

2. The cycle-based counter may use 1 as a step to count every cycle, whereas phase-aware counter may instead use ph_num as a corresponding counting step.

3. The counting of both counters may stop at 0. As such, the last counting step of phase-aware counter may be smaller than the ph_num counting step.

Figure 14:
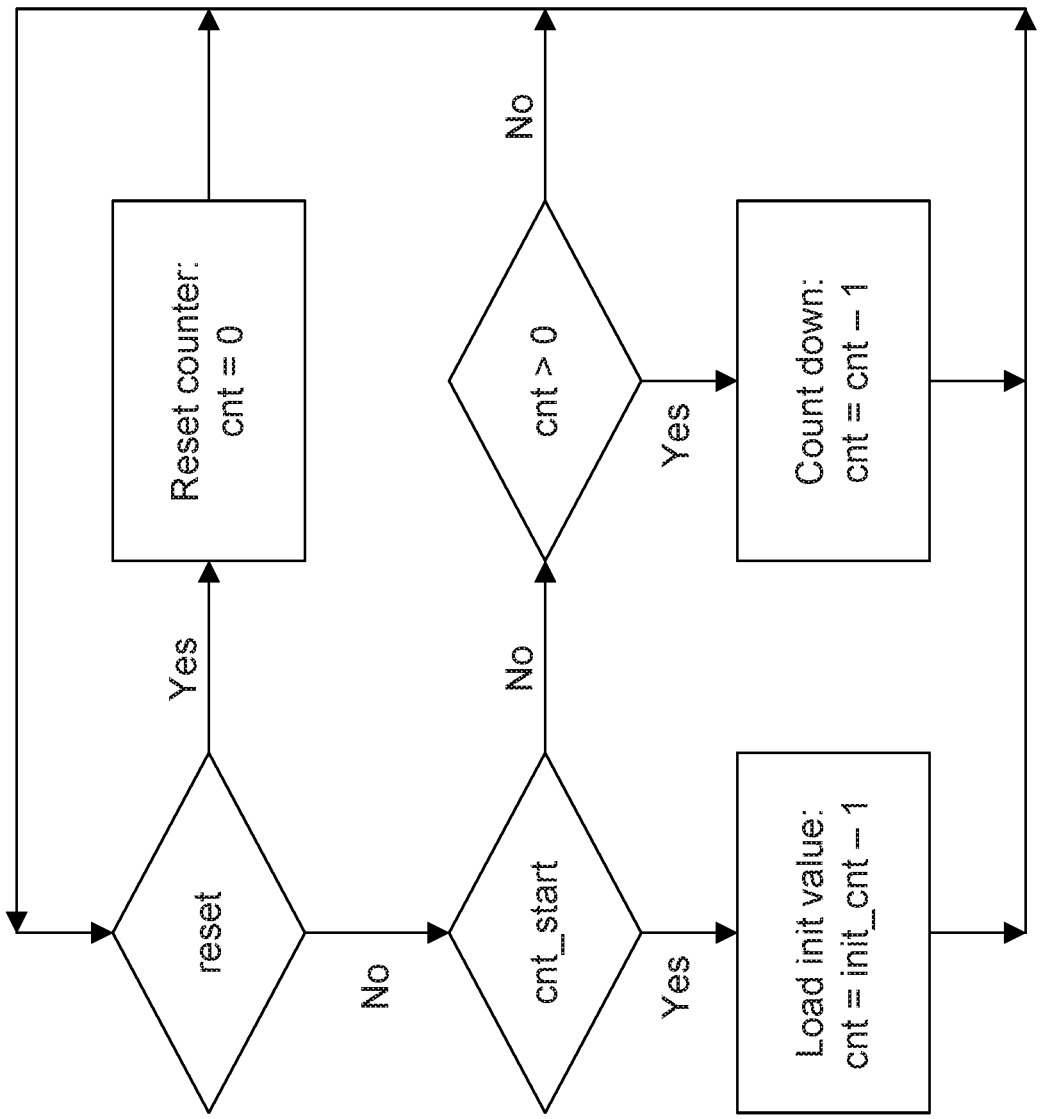
FIG. 14 shows an example flow diagram representing a control flow of a clock-cycle-based counter may operate, according to some embodiments.
Figure 15:
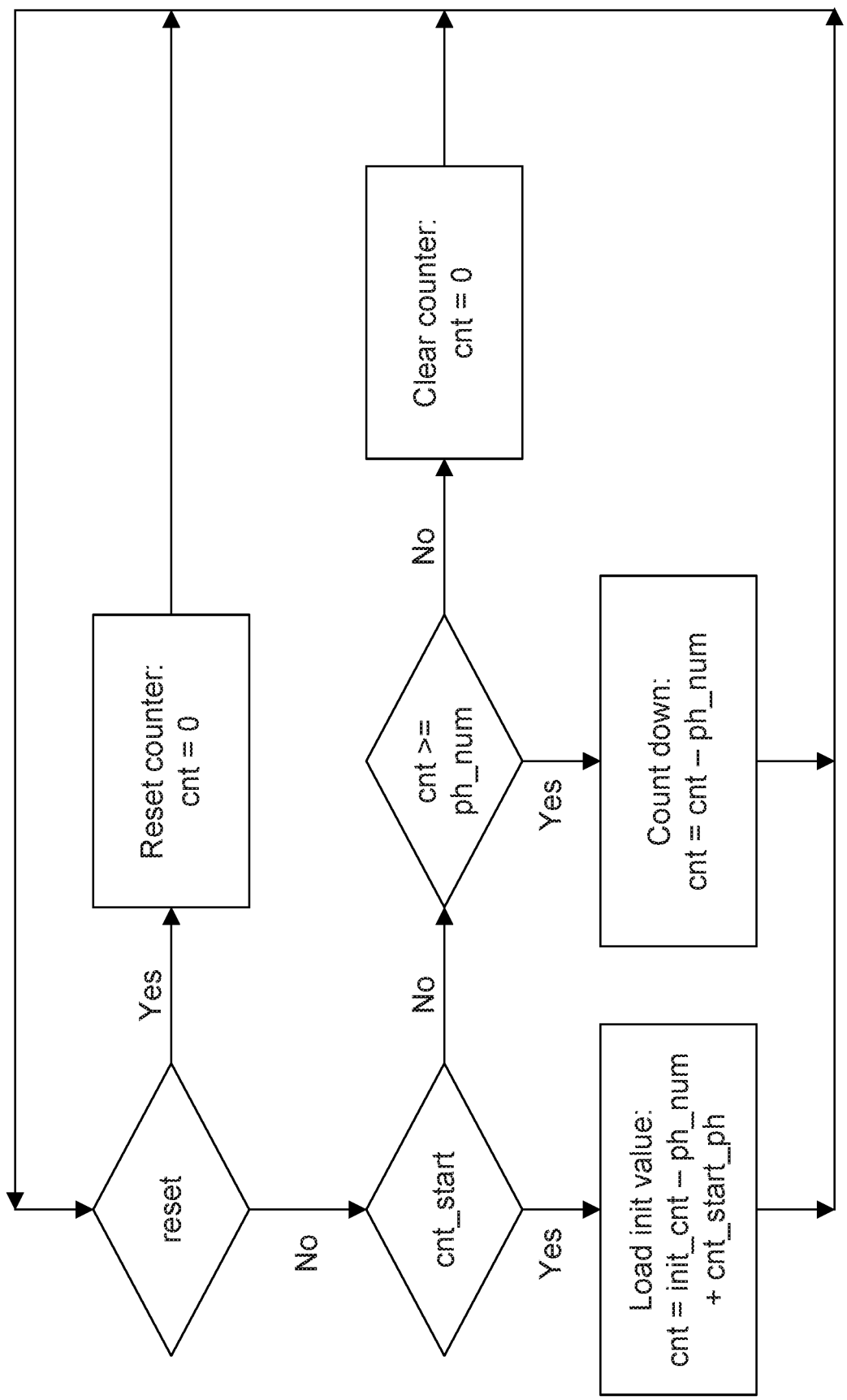
FIG. 15 shows an example flow diagram representing a control flow of a phase-aware counter, according to some embodiments.
Figure 16:
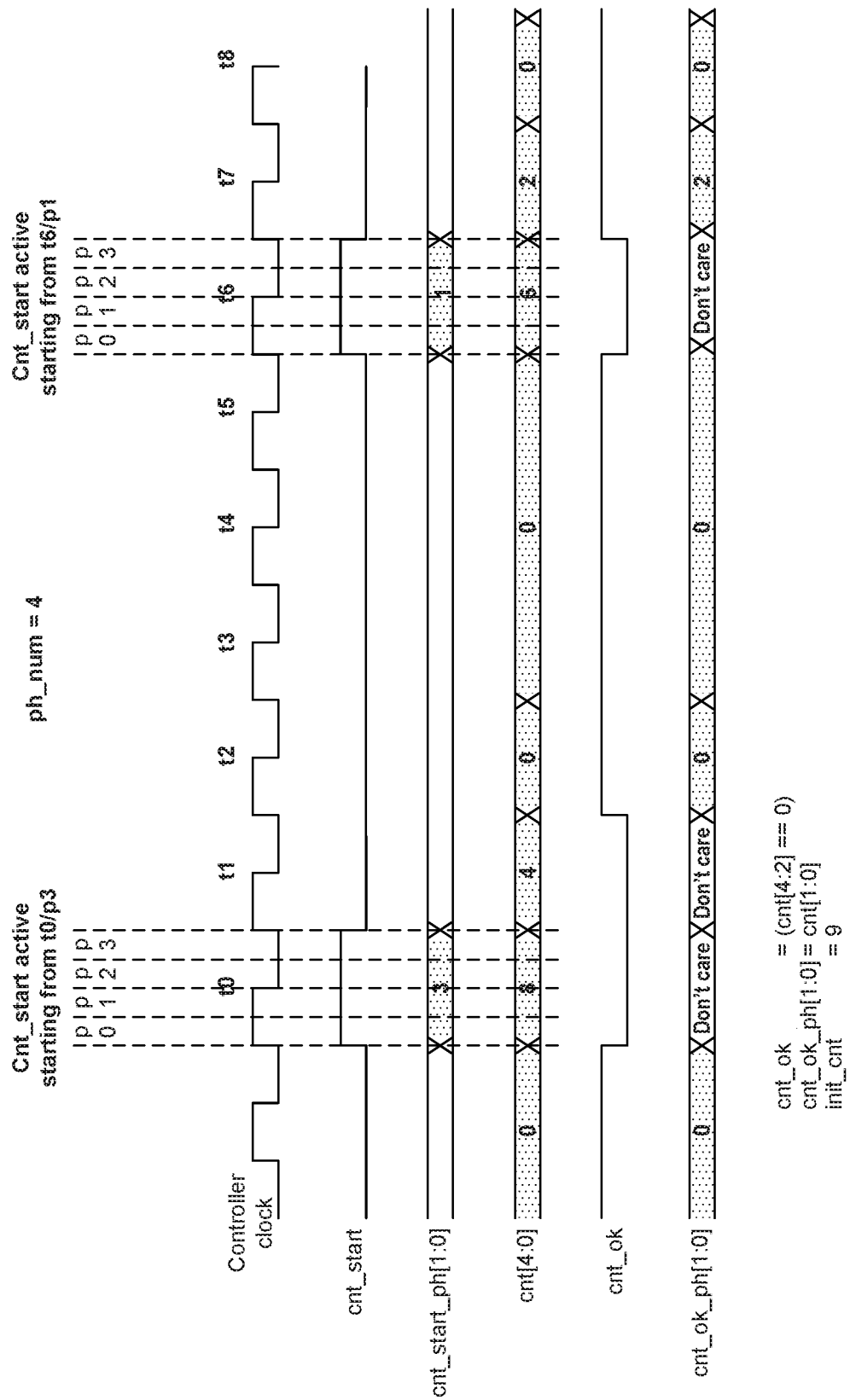
FIG. 16 shows an example of how a phase-aware counter may operate, according to some embodiments.

Additional comparisons of clock-cycle-based counters and phase-aware counters are shown in FIGS. 14-16.

FIG. 14 shows a flow diagram of a clock-cycle-based control flow for a given counter, cnt. This counter, cnt, may recalculate its value at each core clock cycle. For example, cnt may decrement its value by 1 with each core clock cycle, counting down from an initial value, init_cnt, to 0.

FIG. 15 shows a flow diagram of a phase-aware control flow for a given counter, cnt. This counter, cnt, may also recalculate its value at each core clock cycle, counting down from an initial value, init_cnt, to 0. However, additionally, cnt may count down in steps of ph_num, which may be a constant number of phases per clock cycle, in some embodiments. Furthermore, transitions of a separate signal, cnt_start, may account for a specific phase in which such transitions occur, not merely a subsequent edge of the core clock, for example.

FIG. 16 shows an example operation of the phase-aware counter control flow of FIG. 15, for example, in contrast with the clock-cycle-based counter of FIGS. 13 and 14.

As shown in FIG. 16, the signal cnt_start may trigger (cause) a countdown of cnt. Thus, the time at which cnt_start becomes active or high during core clock cycle t0 may actually be phase 3 of t0. Although reading cnt_start based on the controller clock may only show that cnt_start is active for all of t0 (all or nothing), the phase signal corresponding to cnt_start, here called cnt_start_ph, may be detected, separately indicating that cnt_start was not actually active until phase 3 of t0.

In response to cnt_start_ph providing an indication of the phase in which cnt_start was activated (went high), the initial value of cnt may be calculated to compensate for the difference between phase 3 of t0 and the beginning of t0 (phase 0 or p0). As such, cnt may be determined by a relationship defined by the expression init_cnt−ph_num+cnt_start_ph, which in this case of FIG. 16, for cycle t0, evaluates to 9−4+3=8, because ph_num is 4 (representing a total of four phases per clock cycle, based on 2-bit phase (cnt_start_ph[1:0])), and cnt_start was activated in phase 3. Calculation of init_cnt is described further below.

Following the countdown of cnt, again subtracting ph_num, in the next core clock cycle (t1) may then decrement by ph_num, such that cnt becomes 8−4=4. Here, phase does not apply, as additional transition of cnt_start while cnt is non-zero may have no effect, in some embodiments. In cycle t2, the countdown goes to 0 (4−4=0). The counter cnt may follow the same process in cycles t6, t7, and t8, for example.

Further, cnt may be used to generate control signals and other corresponding phase signals, e.g., cnt_ok and cnt_ok_ph. The phase value of cnt_ok_ph may be valid when cnt_ok is high, for example. Thus, in cycle t1, detecting that cnt_ok is 1 and cnt_ok_ph is 0 may signify that cnt_ok is valid starting from phase 0 of cycle t1, for example. Similarly, in cycle t7, cnt_ok is 1 and cnt_ok_ph is 2, meaning cnt_ok is valid starting from phase 2 of cycle t7.

More examples of phase-aware counters are shown in FIGS. 4 and 5.

In FIG. 4, the counter start condition may be an AND'ed condition of multiple signals, for example, cnt_start_cond1 and cnt_start_cond2. These start conditions may each have their own respective phases cnt_start_cond1_ph and cnt_start_cond2_ph. When loading the initial value of the counter at the start, the phase offset may be determined by the maximum phase of the multiple signals—in this example of cnt_start_cond1_ph and cnt_start_cond2_ph, the maximum would be whichever phase is greater, either cnt_start_cond1_ph or cnt_start_cond2_ph.

Alternatively, according to another embodiment shown in FIG. 5, the counter start condition may be an OR'ed condition of multiple signals each having respective phases cnt_start_cond1_ph and cnt_start_cond2_ph. When loading the initial value of the counter at the start, the phase offset may be determined by the minimum value of the phases of the multiple signals—in this example of cnt_start_cond1_ph and cnt_start_cond2_ph, the minimum would be whichever phase is lesser, either cnt_start_cond1_ph or cnt_start_cond2_ph.

Clock-Cycle-Based State Machines and Controls

Figure 6:
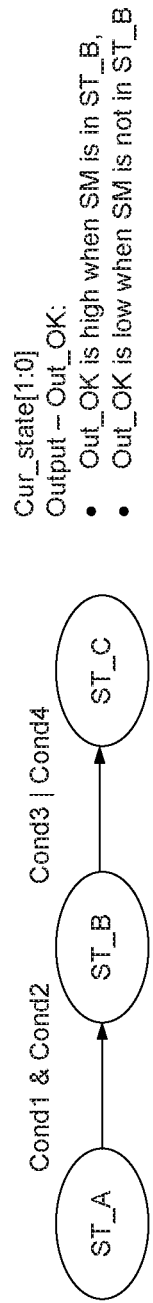
FIG. 6 shows a tri-state state machine that may run at core clock speed, according to some embodiments.

FIG. 6 shows a three-state or tri-state state machine that may run at core clock speed.

Cur_state may represent a current state of the state machine. Cur_state may have one of three values: ST_A, ST_B, and ST_C. These states may transition depending on certain conditions of other signals and their logical relationships. There may additionally be an output, Out_OK.

For example, when Cond1 and Cond2 all are true (high), current state may transition from ST_A to ST_B. When Cond3 or Cond4 is true (high), the current state may transition from ST_B to ST_C, in an embodiment.

Figure 7:
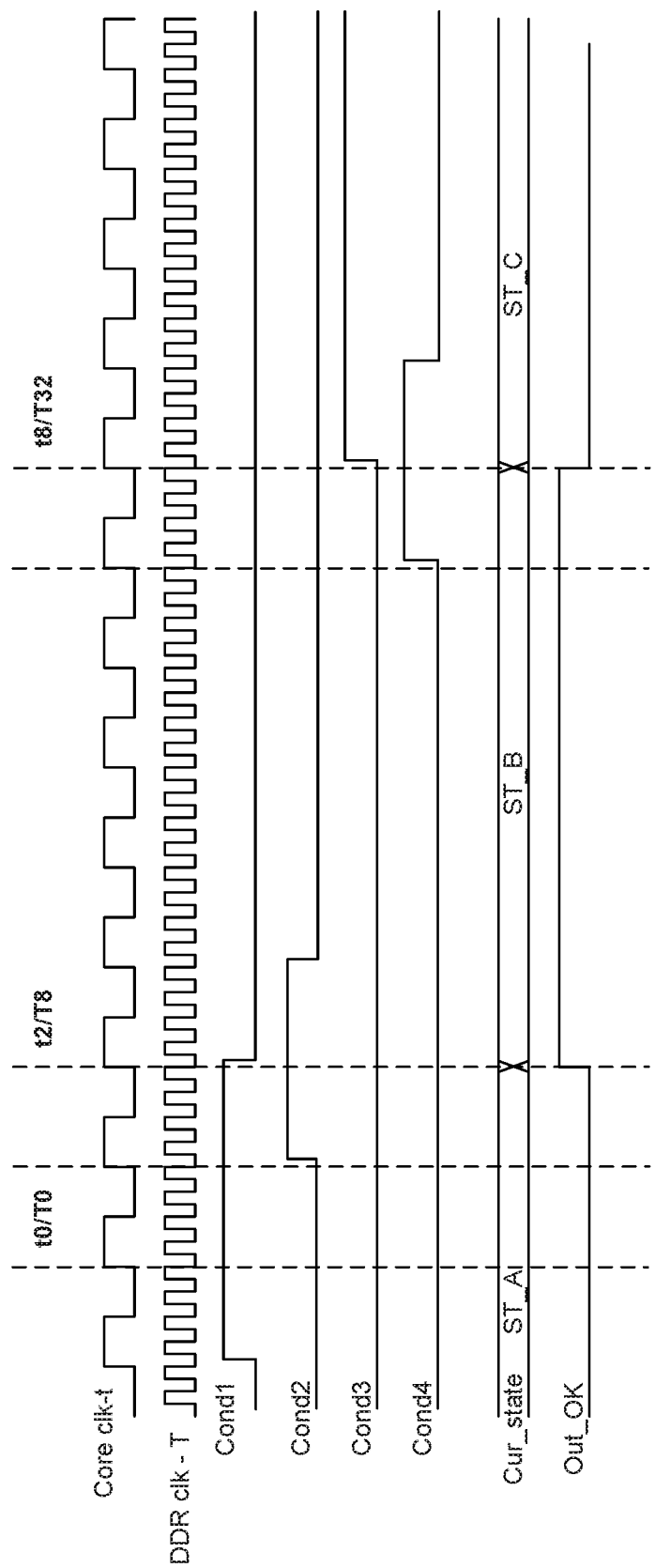
FIG. 7 shows an example of how a state machine may operate, according to some embodiments.

FIG. 7 shows an example of how a state machine may operate. If the state machine runs at core clock speed, signal changes may align with the core clock at the core clock's rising edge, in this example:

701. At t0 (T0), Cond1 is 1 but Cond2 is 0. Cur_state may remain unchanged.

702. At t2 (T8), both Cond1 and Cond2 are 1. Cur_state may then change from ST_A to ST_B, and Out_OK may change to 1.

703. At t8 (T32), although Cond3 is 0, Cond4 is 1. Cur_state may then change from ST_B to ST_C, and Out_OK may change back to 0.

Phase-Aware State Machine and Controls

Following the above examples, the multiple signals and corresponding phases may be used for control, allowing for phase-aware controlling of state machines, for example.

Figure 8:
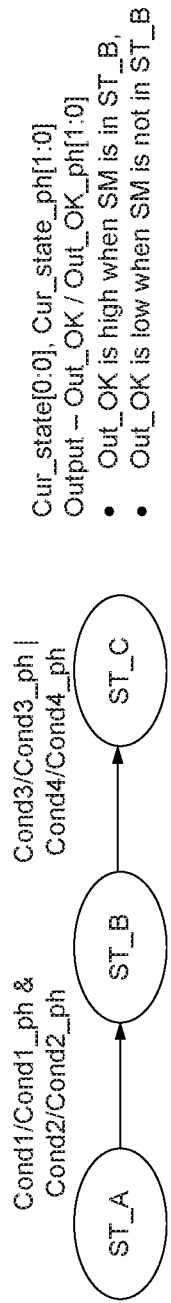
FIG. 8 shows a phase-aware design of a tri-state state machine, according to some embodiments.

FIG. 8 shows a similar state machine as shown in FIG. 6, but instead designed in a phase-aware fashion. For example, Cond1 and Cond1_ph may be a pair of phase-aware signals, which may have the same function as the Cond1 as described with respect to FIGS. 4 and 5, for example. Using Cond1_ph may allow control of Cond1 with finer granularity of control, from clock cycle to clock phase.

Figure 9:
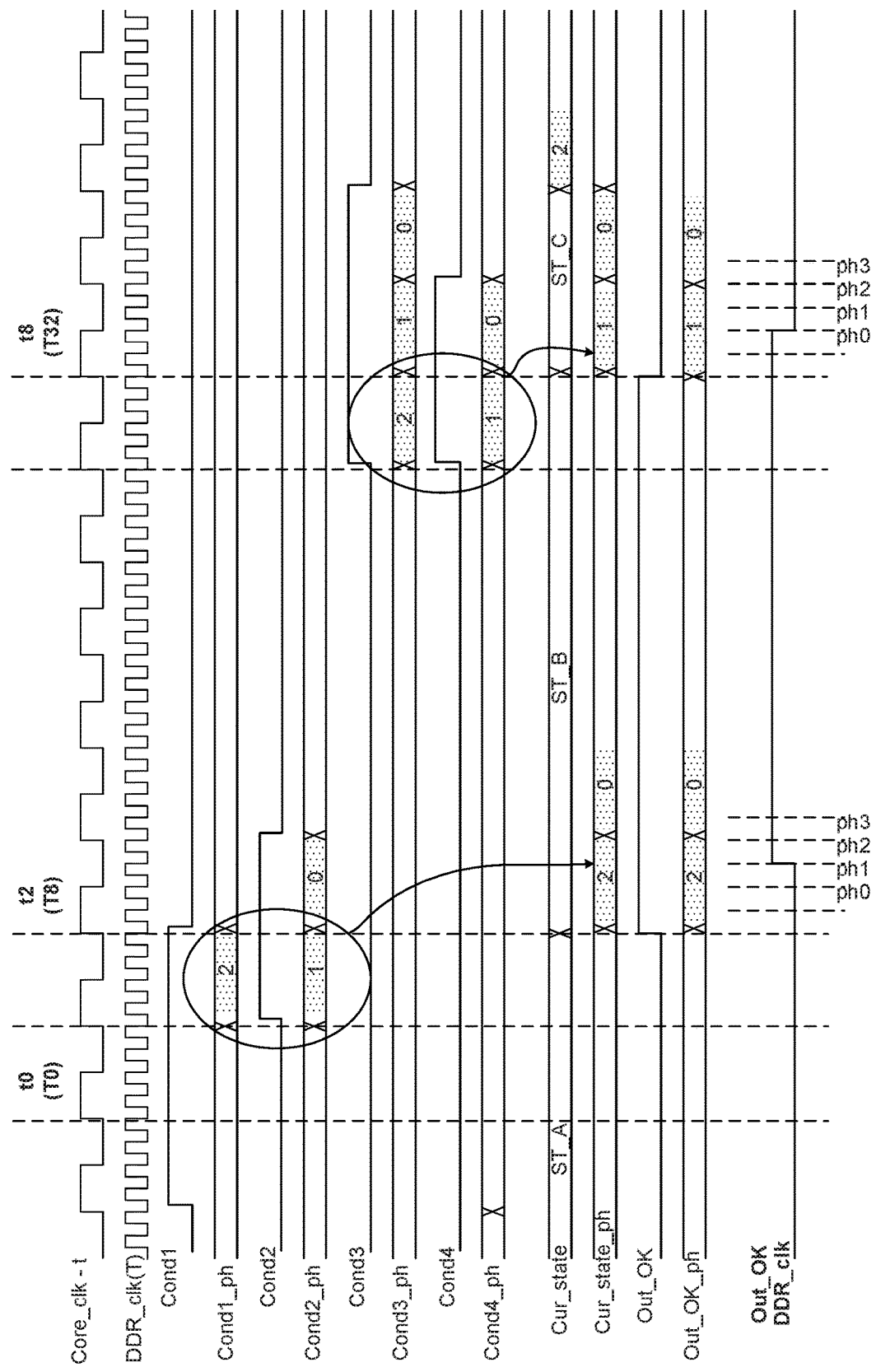
FIG. 9 shows a state-transition example, according to some embodiments.

FIG. 9 shows a state-transition example. Regarding FIG. 9:

901. At t2, Cond1 is 1 and Cond1_ph is 2, meaning Con1 is already high in phase2 t2 (T6).

902. At t2, Cond2 is 1 and Cond2_ph is 1, meaning Cond2 is high in phase1 t2 (T5).

903. At t2, Cond1 and Cond2 both are high, Cur_State may change from ST_A to ST_B. Because the state change condition may be a logical AND of Cond1 and Cond2, the maximum value of Cond1_ph and Cond2_ph may be chosen as Cur_state_ph, which is 2 in this case. Thus, Cur_state may change to ST_B at t2 phase 2 (t2/T6).

904. Out_OK may also change and may use the same phase as Cur_state. Out_OK thus may change (to high) at phase 2 t2 (T6).

905. Similarly, in t8, where both Cond3 and Cond4 change to 1 (high), Cur_state may transit from ST_B to ST_C. Because the state change condition here may be a logical OR of Cond3 and Cond4, the minimum value of Cond3_ph and Cond4_ph may be used as Cur_state_ph, which is 1, in this case. As a result, Cur_state may change to ST_C at phase 1 t8 (T33).

906. By using Out_OK and Out_OK_ph, we can generate Out_OK in DDR clock domain, which aligns with DDR clock.

Using Phase-Aware Control to Improve Performance of DDR Controllers

A phase-aware control mechanism may be employed to improve performance of the use case of FIG. 3A. Results of such improved performance may be seen in FIG. 3B.

Phase-Aware Counters

Counters that may be used for control include t_ccd_cnt and t_rcd_cnt. These counters are described in further detail below.

t_rcd_cnt

The counter t_rcd_cnt may be used to control timing between an ACT command and a RD/WR command. In a clock-cycle-based design, t_rcd_cnt may be configured to count in the core clock domain. A Verilog-based example of a clock-cycle-based t_rcd_cnt design is shown in FIG. 10.

When ACT command is sent, the t_rcd_cnt is loaded with the initial value. The t_rcd_cnt counter may then count down to zero, decrementing in every cycle. When t_rcd_cnt is zero, a RD or WR command may be issued, and as a result, a t_rcd_cnt_ok may be asserted.

The initial value may use a round-up approach or ceiling function to calculate. For example, in an embodiment in which tRCD requires a wait of nine DDR clock cycles, the initial value of t_rcd_cnt (init_t_rcd_cnt) may be 3 for 1:4 mode (accommodating up to twelve DDR clock cycles) and 5 for 1:2 mode (accommodating up to ten DDR clock cycles).

Separately, FIG. 11 shows a Verilog-based example of a phase-aware counter, according to some embodiments. There are two additional variables in the counter of FIG. 11:

1101. fr_mode: may have a value 2 or 4, corresponding to 1:2 mode or 1:4 mode, respectively, according to some embodiments.

1102. act_ph: the phase of the act signal, which may have discrete values ranging from 0 to 1 for 1:2 mode, and 0 to 3 for 1:4 mode, according to some embodiments.

The init_t_rcd_cnt may be the tRCD value of DDR clock domain irrespective of mode or clock cycle ratio. For above case, using a phase-aware counter, init_t_rcd_cnt may be intuitively streamlined as 9 (same as the tRCD value) for any of 1:1, 1:2, and 1:4 modes.

When an ACT command is received, t_rcd_cnt may be loaded with the value resulting from evaluation of the following expression: init_t_rcd_cnt−fr_mode+act_ph. In the example shown in FIG. 11, if the ACT command is received with a value of 0 for act_ph in 1:4 mode, then the t_rcd_cnt may be loaded with a value of 5 (substituting appropriate values into the expression, 9−4+0, results in a value of 5) in next clock cycle. The counter may then continue counting down to 0 by a step of fr_mode. The last step may be less than fr_mode. In other words, for example, the counter may progress from 5 to 1 where fr_step is 4 (5−4=1), and then where the counter is less than fr_mode, the next step may be equal to the current value of the counter itself rather than fr_step, resulting in the counter terminating in a 0 value.

The following control signals may be generated based on t_rcd_cnt:

1. t_rcd_cnt_ok: this signal may be high when t_rcd_cnt [5:2] is 0 in 1:4 mode, or t_ccd_cnt[5:1] is 0 in 1:2 mode.

2. t_red_cnt_ok_ph: may be equal to t_rcd_cnt[1:0] in 1:4 mode, or t_rcd_cnt[0] in 1:2 mode.

t_ccd_cnt

The counter t_ccd_cnt may be used control timing between two RD/WR commands. A Verilog-based example of a phase-aware t_ccd_cnt design is shown in FIG. 12.

Based on t_ccd_cnt, there are two generated control signals:

1. t_ccd_cnt_ok: this signal is high when t_ccd_cnt[5:2] is 0 in 1:4 mode, or t_ccd_cnt[5:1] is 0 in 1:2 mode.
2. t_ccd_cnt_ok_ph: is equal to t_ccd_cnt[1:0] in 1:4 mode, and t_ccd_cnt[0] in 1:2 mode.

wr_ok and wr_ok_ph

When both t_rcd_cnt_ok and t_ccd_cnt_ok are high, then wr_ok may also be high as the result of a logical AND condition. Thus, wr_ok_ph may be assigned the maximum value of t_rcd_cnt_ok_ph and t_ccd_cnt_ok_ph.

wr_ok=t_rcd_cnt_ok & t_ccd_cnt_ok
wr_ok_ph=max(t_rcd_cnt_ok_ph, t_ccd_cnt_ok_ph)

Example of Phase-Aware Control

Figure 3B:
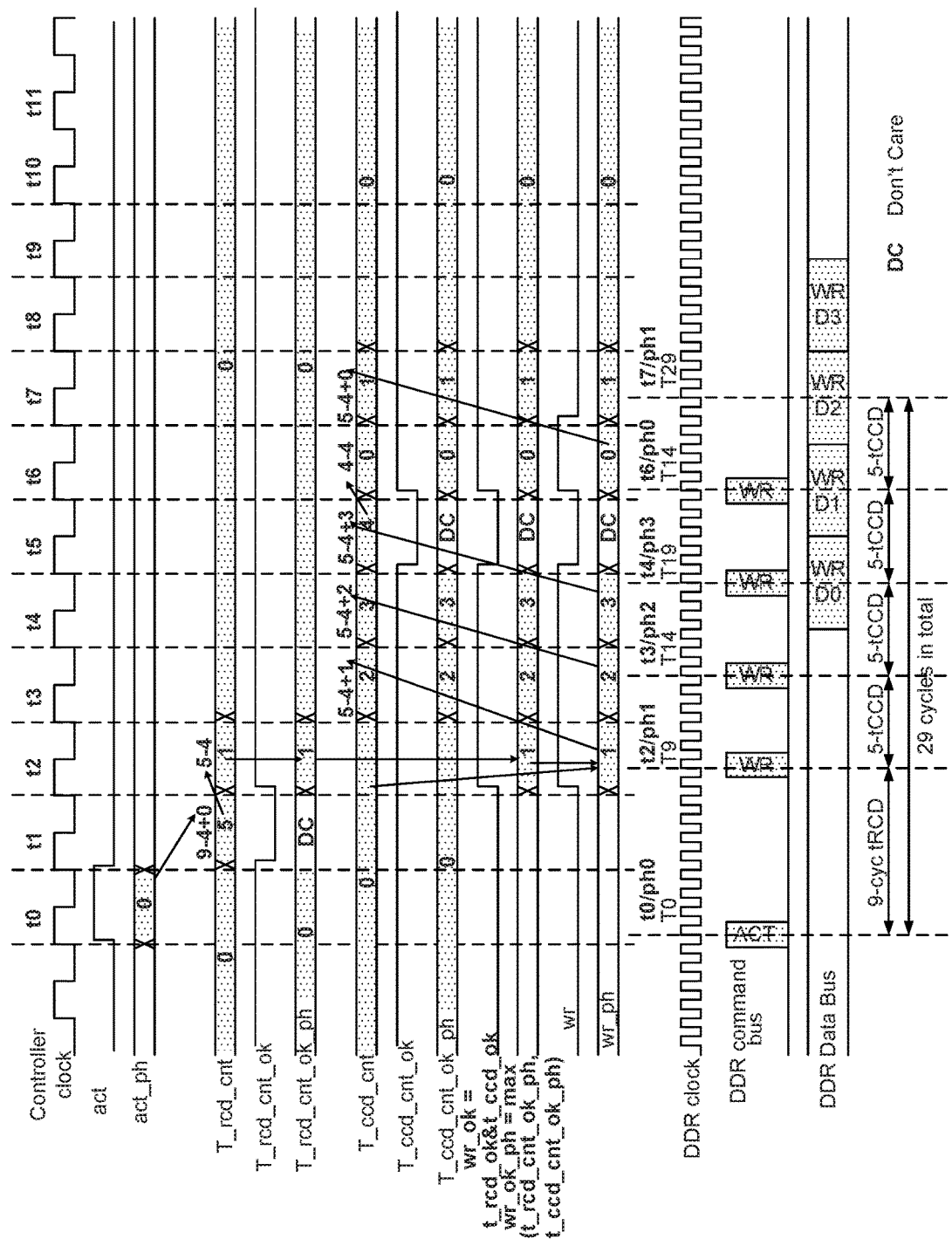
FIG. 3B shows a phase-aware 1:4-mode example of a command sequence, according to some embodiments.

FIG. 3B illustrates performance improvement resulting from phase-aware control as applied to the use case described above in FIG. 3A, as an example. Regarding FIG. 3B:

1. If *_ok is 0, the *_ok_ph value is Don't-Care (DC).
2. fr_mode=4, init_t_rcd_cnt=9, init_t_ccd_cnt=5.
3. At cycle t0, act=1, act_ph=0. The counter t_rcd_cnt may be loaded with value (init_t_rcd_cnt−fr_mode+act_ph)=9−4+0=5 in the next core clock cycle, t1.
4. At cycle t1, t_rcd_cnt value is 5. The control signal t_rcd_cnt_ok may change to 0 when t_rcd_cnt[5:2] is not zero. The t_rcd_cnt counter may continue counting.
5. At cycle t2,
   a. the value of the counter t_rcd_cnt may change to 1, and as a result, t_rcd_cnt[5:2] may change 0 at t2, t_rcd_cnt_ok may change to 1, and t_rcd_cnt_ok_ph may be 1 (value of t_rcd_cnt[1:0]);
   b. wr_ok=t_rcd_cnt_ok & t_ccd_cnt_ok=1 & 1=1;
   c. wr_ok_ph=max(t_rcd_cnt_ok_ph, t_ccd_cnt_ok_ph)=max(1, 0)=1;
   d. where wr_ok is 1 at t2, a WR command may be issued (wr=1, and wr_ph=wr_ok_ph=1); and
   e. where wr is 1 at t2, t_ccd_cnt may be loaded with a new value of (init_t_ccd−fr_mode+wr_ph)=(5−4+1)=2 in next the next core clock cycle, t3.
6. At cycle t3,
   a. the counter t_rcd_cnt may continue counting, changing to 0. The control signal t_rcd_cnt_ok may remain at 1, while t_rcd_cnt_ok_ph may change to 0;
   b. the counter t_ccd_cnt may be loaded with new value of 2, t_ccd_cnt_ok may remain at 1, and t_ccd_cnt_ok_ph may change to 2;
   c. wr_ok=t_rcd_cnt_ok & t_ccd_cnt_ok=1 & 1=1;
   d. wr_ok_ph=max(t_rcd_cnt_ok_ph, t_ccd_cnt_ok_ph)=max(0, 2)=2;
   e. where wr_ok is 1 at t3, a WR command may be issued (wr=1, and wr_ph=wr_ok_ph=2); and
   f. where wr is 1 at t3, t_ccd_cnt may be loaded with new value of (init_t_ccd−fr_mode+wr_ph)=(5−4+2)=3 in next cycle, t4.
7. At cycle t4,
   a. the counter t_rcd_cnt may be 0, the control signal t_rcd_cnt_ok may remain at 1, and corresponding phase value t_rcd_cnt_ok_ph may be 0;
   b. the counter t_ccd_cnt may be loaded with a new value of 3, the control signal t_ccd_cnt_ok may remain at 1, and corresponding phase value t_ccd_cnt_ok_ph may change to 3;
   c. wr_ok=t_rcd_cnt_ok & t_ccd_cnt_ok=1 & 1=1;
   d. wr_ok_ph=max(t_rcd_cnt_ok_ph, t_ccd_cnt_ok_ph)=max(0, 3)=3;
   e. where wr_ok is 1 at t4, a WR command may be issued (wr=1, wr_ph=wr_ok_ph=3); and
   f. where wr is 1 at t4, t_ccd_cnt may be loaded with new value of (init_t_ccd−fr_mode+wr_ph)=(5−4+3)=4 in the next cycle, t5.
8. At cycle t5,
   a. the counter t_rcd_cnt may be 0, the control signal t_rcd_cnt_ok may remain at 1, and corresponding phase value t_rcd_cnt_ok_ph may be 0;
   b. the counter t_ccd_cnt may be loaded with new value of 4, the control signal t_ccd_cnt_ok may change to 0 when t_ccd_cnt[5:2] is not zero, and corresponding phase value t_ccd_cnt_ok_ph is Don't-Care at t5;
   c. wr_ok=t_rcd_cnt_ok & t_ccd_cnt_ok=1 & 0=0;
   d. wr_ok_ph may be Don't-Care where wr_ok is 0;
   e. where wr_ok is 0 at t5, there may be no WR command to issue; and
   f. where wr is 0 at t5, t_ccd_cnt may continue counting down to zero ((t_ccd_cnt−fr_mode)=(4−4)=0) in the next cycle, t6.
9. At cycle t6,
   a. the counter t_rcd_cnt may terminate at 0, the control signal t_rcd_cnt_ok may remain at 1, and t_rcd_cnt_ok_ph may be 0;
   b. the counter t_ccd_cnt may change to 0, the control signal t_ccd_cnt_ok may change to 1, and corresponding phase value may t_ccd_cnt_ok_ph change to 0;
   c. wr_ok=t_rcd_cnt_ok & t_ccd_cnt_ok=1 & 1=1;
   d. wr_ok_ph=max(t_rcd_cnt_ok_ph, t_ccd_cnt_ok_ph)=max(0, 0=0;
   e. where wr_ok is 1 at t4, a WR command may be issued (wr=1, wr_ph=wr_ok_ph=0); and
   f. where wr is 1 at t6, t_ccd_cnt may be loaded with a new value of 1 ((init_t_ccd−fr_mode+wr_ph)=(5−4+0)=1) in the next cycle, t7.
10. At cycle t7, after the four WR commands have been issued, with no remaining WR commands to be sent out, wr may change to 0, and other may continue counting to reach 0.

Thus, signals act and act_ph, and signals wr and wr_ph, may be used to generate command sequences (e.g., for ACT commands and WR commands, respectively) in the DDR interface clock domain. In so doing, relative performance may meet or exceed that shown in FIG. 2, regardless of whether or not the mode is 1:1—compared with FIG. 3A, performance may be significantly improved in a use case of 1:4 mode, for example.

Thus, in bus controller design, phase-aware controlling may significantly improve the controller's performance, especially for 1:2 and 1:4 modes. Certain benefits include shortening access latency (e.g., twelve cycles in the example of FIG. 3A, improved down to nine cycles in the example of FIG. 3B), and increased bus utilization (e.g., 62.5% in the example of FIG. 3A, improved up to 100% in the example of FIG. 3B).

Phase-aware controlling thus allows finer granularity in signals and state control, from discrete clock cycles down to sub-phase of a clock cycle, even without use of any actual clock running faster than the core clock. The approach of the enhanced techniques described herein thus provides additional efficiencies and improvements over designs that are solely clock-cycle-based, and over conventional technologies that may rely on such designs.

Example Computer Systems

Figure 17:
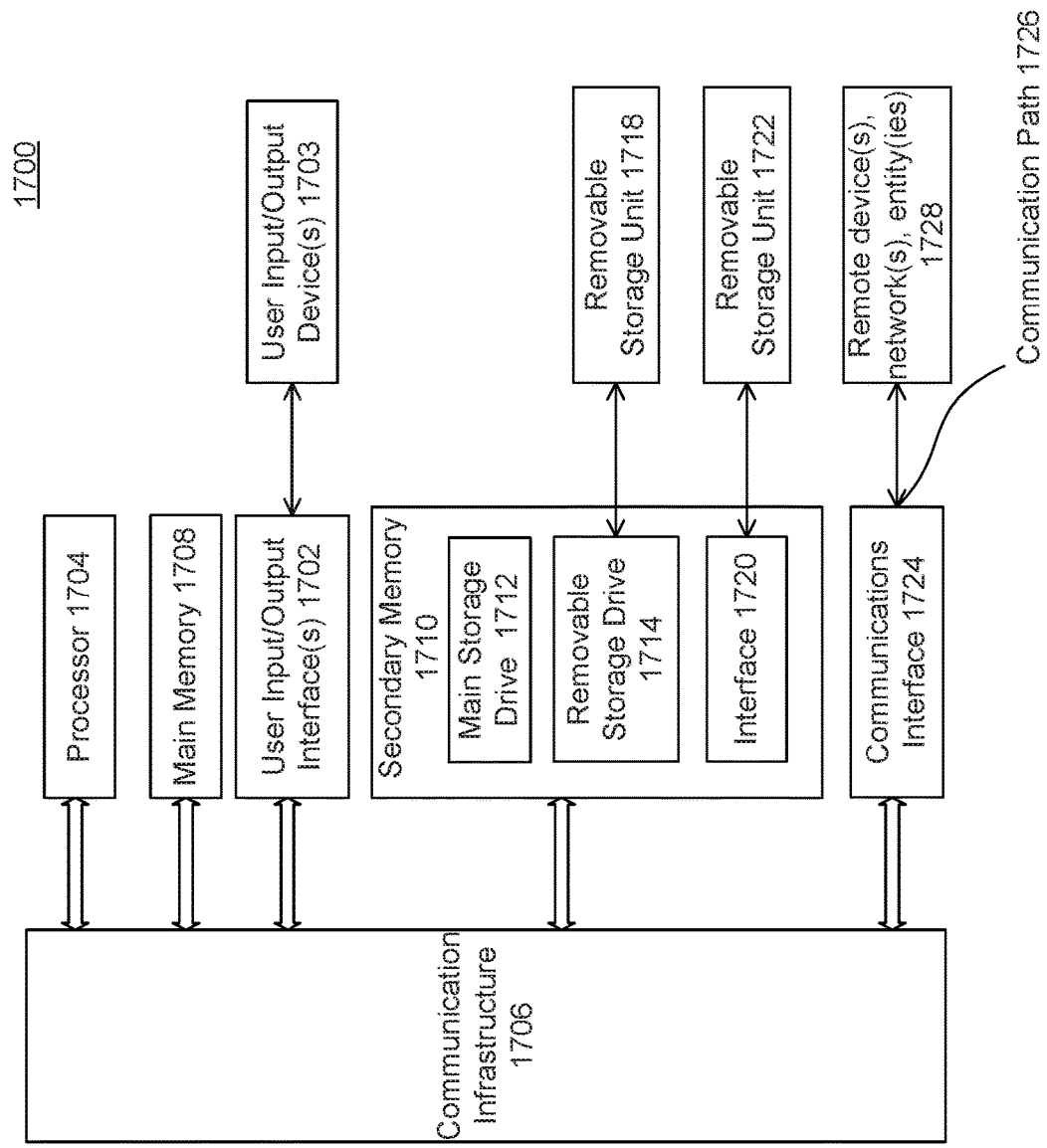
FIG. 17 shows an example computer system useful for implementing various embodiments.

Various embodiments may be implemented, for example, using one or more well-known computer systems, such as computer system 1700 shown in FIG. 17. One or more computer systems 1700 may be used, for example, to implement any of the embodiments discussed herein, as well as combinations and sub-combinations thereof.

Computer system 1700 may include one or more processors (also called central processing units, or CPUs), such as a processor 1704. the processor may be, include, or be implemented using any of a microprocessor, graphics processing unit (GPU), or digital signal processor (DSP), or various electronic processing equivalents, such as an application specific integrated circuit (ASIC) or programmable logic device (PLD), such as a field programmable gate array (FPGA), among other embodiments. Processor 1704 may be connected to a bus or communication infrastructure 1706.

Computer system 1700 may also include user input/output device(s) 1703, such as monitors, keyboards, pointing devices, etc., which may communicate with communication infrastructure 1706 through user input/output interface(s) 1702.

One or more of processors 1704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 1704 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 1700 may also include a main or primary memory 1708, such as random access memory (RAM). Main memory 1708 may include one or more levels of cache. Main memory 1708 may have stored therein control logic (i.e., computer software) and/or data.

Computer system 1700 may also include one or more secondary storage devices or secondary memory 1710. Secondary memory 1710 may include, for example, a main storage drive 1712 and/or a removable storage device or drive 1714. Main storage drive 1712 may be a hard disk drive or solid-state drive, for example. Removable storage drive 1714 may be a floppy disk drive, a magnetic tape drive, a compact disk drive, an optical storage device, tape backup device, and/or any other storage device/drive.

Removable storage drive 1714 may interact with a removable storage unit 1718. Removable storage unit 1718 may include a computer usable or readable storage device having stored thereon computer software (control logic) and/or data. Removable storage unit 1718 may be a floppy disk, magnetic tape, compact disk, DVD, optical storage disk, and/any other computer data storage device. Removable storage drive 1714 may read from and/or write to removable storage unit 1718.

Secondary memory 1710 may include other means, devices, components, instrumentalities or other approaches for allowing computer programs and/or other instructions and/or data to be accessed by computer system 1700. Such means, devices, components, instrumentalities or other approaches may include, for example, a removable storage unit 1722 and an interface 1720. Examples of the removable storage unit 1722 and the interface 1720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1700 may further include a communication or network interface 1724. Communication interface 1724 may enable computer system 1700 to communicate and interact with any combination of external devices, external networks, external entities, etc. (individually and collectively referenced by reference number 1728). For example, communication interface 1724 may allow computer system 1700 to communicate with external or remote devices 1728 over communication path 1726, which may be wired and/or wireless (or a combination thereof), and which may include any combination of LANs, WANs, the Internet, etc. Control logic and/or data may be transmitted to and from computer system 1700 via communication path 1726.

Computer system 1700 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 1700 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, j Query, Dojo, Dijit, OpenUI5, AngularJS, Express.js, Backbonej s, Emberjs, DHTMLX, Vue, React, Electron, and so on, among many other non-limiting examples.

Computer system 1700 may include hardware design tools, including but not limited to electronic design automation (EDA) and electronic computer-aided design (ECAD), which may further include capabilities of high-level synthesis, logic synthesis, simulation (physical, logical, and/or behavioral), analysis, and/or verification (physical, functional, and/or formal, including clock-domain crossing), among other related functionalities useful for circuit design or development of hardware, electronic or otherwise. Included hardware design tools may further include compilers, assemblers, and/or interpreters for hardware design languages including but not limited to VHDL, Verilog, SystemC, SpecC, SystemVerilog, and/or any high-level software language that may be translated or compiled to register-transfer level (RTL) hardware description or netlist, for example. Any of the above languages or equivalents may be used to specify hardware elements for implementing technology that may leverage the enhanced techniques described herein.

As used herein, the term "module" may signify a tangible data- or information-processing device, that may be limited in size or complexity. Additionally, a module may refer to at least one method or procedure to transform data or information, such as in a computer program. A module may also refer to a network of digital logic devices, such as gates, latches, flip-flops, and/or registers, for example, in which interconnections among logic devices may give structure to the network.

Methods or procedures forming a module, specified in a software-programming or hardware-description language, may be used to generate a specification for a network of digital logic devices to process data or information with repeatable results obtained from such methods or procedures. As used herein, the term "algorithm" may signify a sequence or set of operations or instructions that a module may use to transform data and information to achieve a result, which may be repeatable. A module may include one or more algorithm.

A module may be permanently configured (e.g., hard-wired to form hardware), temporarily configured (e.g., programmed with software), or a combination of the two configurations (for example, a "structured ASIC" or other programmable logic device). Permanently configured modules, such as arithmetic logic units (ALUs), programmable logic arrays (PLAs), or read-only memories (ROMs), may be configured during manufacturing. Temporarily configured modules may be manufactured, for example, using field programmable gate arrays (FPGAs), random access memories (RAMs), or microprocessors, for example. A module may be configured to process data and information, typically using one or more sequence transformations (also referred to as operations) applied to the data or information, and/or transforming data or information by using, e.g., input address of memory that may stores output data or information, to perform aspects of the enhanced techniques disclosed herein.

Temporarily configured modules need not be configured at any one time. For example, a processor comprising one or more modules may have the one or more modules configured separately at different times. The processor may comprise a set of one or more modules at one particular time, and may comprise a different set of one or more modules at a different time. The decision to manufacture or implement a module in a permanently configured form, a temporarily configured form, or any combination of the two forms, may be driven by cost, time considerations, engineering constraints and/or specific design goals. The substance of a module's processing is independent of the form in which it may be manufactured or implemented.

As described herein, providing control elements associated with corresponding phase can be appreciated as an approach to address technical problems of memory latency and/or bus underutilization as mentioned above, allowing more granular control for quicker memory accesses and improved efficiency of bus utilization. Such technical solutions and their overall advantages, as well as other improvements and/or solutions to other technical problems, can be readily appreciated by those of ordinary skill in the relevant art(s) upon reading this disclosure. To solve the technical problems described above, technical solutions include phase-aware controllers, counters, timers, clocks, schedulers, signals, and/or other control elements, which may be provided, as electronically structured modules, for example, that may include modules designed in hardware, firmware, software, hardware description, or any combination thereof, in accordance with at least the non-limiting examples mentioned above.

Where DDR may be referenced as a common use case of double data rate, it can be appreciated that any data rate may be used, including single data rate (SDR) or quad data rate (QDR), for example. Phase-aware control (or, by extension, phase computing) may be used regardless of data bus width, data rate, clock rate, or pumping, for example. Aside from other common use cases of memory controllers, the enhanced techniques described herein may be applied to any other kind of bus architecture or input/output (I/O) protocols. Other applications include peripheral buses, serial buses, parallel buses, etc.

Where certain benefits may be realized when there is disparity in clock speeds, e.g., where a core clock is slower than an interface clock. For example, such benefits may be realized in some embodiments where the interface clock speed is an integer multiple of the core clock speed, e.g., 3, 5, 8, 10, etc., not only 2 or 4, as more commonly referenced in examples above.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1700, main memory 1708, secondary memory 1710, and removable storage units 1718 and 1722, as well as tangible articles of manufacture embodying any combination of the foregoing. Such control logic, when executed by one or more data processing devices (such as computer system 1700), may cause such data processing devices to operate as described herein.

CONCLUSION

Based on the teachings contained in this disclosure, it may be apparent to persons skilled in the relevant art(s) how to make and use embodiments of this disclosure using data processing devices, computer systems and/or computer architectures other than that shown in FIG. 17. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

We claim:

1. An electronic structure, comprising:
a first module configured to function as a bus controller, the first module being further configured to be activated in response to a first command and to wait for a first time period in response to being activated, wherein the first module has a first clock speed and drives a second module having a second clock speed, wherein the second module is configured to function as an interface; and
a first circuit element structured to detect a first phase value of a first signal; wherein:
the first module is further configured to process a second command following passage of the first time period, wherein to process the second command, the first module is further configured to wait for a second time period, and wherein the second time period is determined based on the detected first phase value of the first signal and a ratio of the first clock speed to the second clock speed.

2. The electronic structure of claim 1, wherein the first clock speed is slower than the second clock speed.

3. The electronic structure of claim 2, wherein the second clock speed is an integer multiple of the first clock speed.

4. The electronic structure of claim 2, wherein the first module is communicatively coupled with a data bus, wherein the data bus is configured to handle a plurality of data input/output (I/O) events, consecutively, and wherein a gap between consecutive I/O events on the data bus has a duration of less than one clock cycle at the second clock speed.

5. The electronic structure of claim 1, further comprising a second circuit element structured to detect a second phase value of a second signal.

6. The electronic structure of claim 5, wherein a maximum value of the first phase value and the second phase value represent a result of a logical AND condition.

7. The electronic structure of claim 5, wherein a minimum value of the first phase value and the second phase value represent a result of a logical OR condition.

8. The electronic structure of claim 1, further comprising at least one second circuit element structured to calculate a value of a phase-aware counter based on an actual value of the phase-aware counter and an actual phase value of a corresponding signal, and structured to decrement the phase-aware counter by subtracting a number of phase values in a clock cycle.

9. The electronic structure of claim 1, further comprising at least one second circuit element structured to calculate an initial value of a phase-aware counter based on a number of phase values in a clock cycle, a number of clock cycles in a given bus command, and a rounding function.

10. The electronic structure of claim 1, wherein the first phase value is associated with a control signal.

11. A system, comprising:
- a bus controller configured to be activated in response to a first command, wherein the bus controller has a first clock speed and drives an interface having a second clock speed, wherein the bus controller is further configured to wait for a first time period in response to being activated; and
- a first circuit element structured to detect a first phase value of a first signal; wherein:
- the bus controller is further configured to process a second command following passage of the first time period, wherein to process the second command, the bus controller is further configured to wait for a second time period, and wherein the second time period is determined based on the detected first phase value of the first signal and a ratio of the first clock speed to the second clock speed.

12. The system of claim 11, wherein the first clock speed is slower than the second clock speed.

13. The system of claim 12, wherein the second clock speed is an integer multiple of the first clock speed.

14. The system of claim 12, wherein the bus controller is communicatively coupled with a data bus, wherein the data bus is configured to handle a plurality of data input/output (I/O) events, consecutively, and wherein a gap between consecutive I/O events on the data bus has a duration of less than one clock cycle at the second clock speed.

15. The system of claim 11, further comprising a second circuit element configured to detect a second phase value of a second signal.

16. The system of claim 15, wherein a maximum value of the first phase value and the second phase value represent a result of a logical AND condition.

17. The system of claim 15, wherein a minimum value of the first phase value and the second phase value represent a result of a logical OR condition.

18. The system of claim 11, further comprising a phase-aware counter having a value calculated based on an actual value of the phase-aware counter and an actual phase value of a corresponding signal, wherein the phase-aware counter is configured to be decremented by subtracting a number of phase values in a clock cycle.

19. The system of claim 11, further comprising a phase-aware counter having an initial value based on a number of phase values in a clock cycle, a number of clock cycles in a given bus command, and a rounding function.

20. The system of claim 11, wherein the first phase value is associated with a control signal.

\* \* \* \* \*